(12) United States Patent
Maor et al.

(10) Patent No.: US 11,818,157 B2
(45) Date of Patent: Nov. 14, 2023

(54) REAL-TIME DETECTION OF RISKY EDGE IN LATERAL MOVEMENT PATH

(71) Applicant: MICROSOFT TECHNOLOGY LICENSING, LLC., Redmond, WA (US)

(72) Inventors: Tal Joseph Maor, Tel Aviv (IL); Shahar Nussbaum, Tel Aviv (IL); Or Tsemah, Tel Aviv (IL); Dan Yaari, Givatayim (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 771 days.

(21) Appl. No.: 16/732,169

(22) Filed: Dec. 31, 2019

(65) Prior Publication Data

US 2021/0203684 A1 Jul. 1, 2021

(51) Int. Cl.
  *G06F 21/62* (2013.01)
  *H04L 9/40* (2022.01)
  *G06F 16/28* (2019.01)
  *G06F 16/23* (2019.01)

(52) U.S. Cl.
  CPC ...... *H04L 63/1433* (2013.01); *G06F 16/2379* (2019.01); *G06F 16/288* (2019.01); *G06F 21/6218* (2013.01)

(58) Field of Classification Search
  CPC .......... G06F 16/2379; G06F 16/288; G06F 21/6218; H04L 63/14; H04L 63/1433
  See application file for complete search history.

(56) References Cited

U.S. PATENT DOCUMENTS

| | | | |
|---|---|---|---|
| 7,013,395 B1* | 3/2006 | Swiler | H04L 63/1433 713/153 |
| 8,938,781 B1* | 1/2015 | Bobel | H04L 63/104 726/4 |
| 2020/0177617 A1* | 6/2020 | Hadar | G06F 21/577 |
| 2021/0200901 A1* | 7/2021 | Vemula | G06F 18/2323 |
| 2022/0191230 A1* | 6/2022 | Morgan | H04L 63/1425 |

OTHER PUBLICATIONS

"International Search Report and Written Opinion Issued in PCT Application No. PCT/US20/060321", dated Feb. 10, 2021, 12 Pages.

* cited by examiner

*Primary Examiner* — Marcin R Filipczyk

(57) ABSTRACT

The detection of a risky edge in a lateral movement path is detected by determining the weakest point in the configuration of the user accounts, groups, and devices having access to the resources of a tenant of the cloud service. A lateral movement graph having nodes of user accounts, devices, and groups and edges representing relationships between the nodes is used to compute a risk score for each edge in the graph. The risk score of an edge is used to identify a weak connection and potential target for a lateral movement attack.

15 Claims, 10 Drawing Sheets

| ENTITY NAME 402 | ACTION 404 | TARGET 406 | SECURITY IMPACT 408 |
|---|---|---|---|
| USER1 | REMOVE FROM GROUP | FINANCE USERS GROUP | 442 — 410 |
| USER20 | PREVENT LOGIN TO DEVICE | RDPSV | 20 — 412 |
| TEMPADMIN | REMOVE FROM LOCAL ADMIN ON | HELPDESK SERVER | 10 — 414 |
| EXCH01 | REMOVE FROM GROUP | DOMAIN ADMINS GROUP | 5 — 416 |
| USER3 | PREVENT LOGIN TO DEVICE | DC5 | 5 — 418 |

*FIG. 4*

Edge 2->3
Count of distinct detached non-sensitive nodes = 2
Count of distinct detached sensitive nodes = 0
Count of distinct paths containing the edge = 3
Risk score = (w1 * 2) + (w2 * 0) + (w3 * 3)

Edge 2->5
Count of distinct detached non-sensitive nodes = 0
Count of distinct detached sensitive nodes = 0
Count of distinct paths containing the edge = 1
Risk score = (w1 * 0) + (w2 * 0) + (w3 * 1)

REAL-TIME DETECTION OF RISKY EDGE IN LATERAL MOVEMENT PATH

BACKGROUND

Cybersecurity techniques utilize numerous defense mechanisms to prevent the risk of an attack to the computer systems of an organization. Lateral movement is a type of attack where a cybercriminal moves through a network using credentials and permissions stolen from each computing device in its path. The cybercriminal infiltrates an initial device to obtain credentials and/or permissions that enable the cybercriminal to access and compromise other computing devices within the network. Eventually, the cybercriminal locates credentials with elevated permissions to access domain controllers and other highly-secure computing devices where the cybercriminal may compromise all computers within a domain of an organization in addition to external domains associated with the organization. If a lateral movement is not detected, a global intrusion may result with catastrophic consequences. Often the real time detection of a lateral movement attack may not be caught in time to prevent such catastrophic consequences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The detection of a risky edge in a lateral movement graph is identified by determining the weakest point in the configuration of the entities (e.g., user accounts, groups, devices) that have access to the resources of a tenant of a cloud service. A lateral movement graph includes paths from a non-sensitive entity to a sensitive entity. Each edge in the lateral movement graph is analyzed in real-time to identify risky edges having the potential for a lateral movement attack.

A lateral movement graph is a directed acyclic graph having nodes representing user accounts, devices, and groups and edges representing the relationship between the two nodes connected to an edge. Each node is classified as sensitive or non-sensitive depending on the permissions, roles, and credentials associated with the entity of the node. The graph contains paths from a non-sensitive node to a sensitive node. Each edge in each lateral movement graph is analyzed to determine whether the edge can lead to a lateral movement attack to a sensitive entity based on the paths that the edge is part of and the entities and relationships of the entities in those paths.

A risk score is computed for each edge in a path in the graph based on the number of distinct non-sensitive nodes that cannot be reached when the edge is detached, the number of distinct sensitive nodes that cannot be reached when the edge is detached, and the number of distinct paths containing the edge. The risk score for an edge identifies whether an edge is on a path to a sensitive node for which a preventive action should be taken.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 4 is a schematic diagram illustrating an exemplary report identifying risky entities and recommended actions to deter a lateral movement attack.

DETAILED DESCRIPTION

Overview

The subject matter pertains to the detection of a risky edge in a lateral movement graph that represents a tenant of a cloud service. The cloud service provides a convenient, on-demand network access to a shared pool of configurable computing resources that can be rapidly generated and released with nominal management effort or interaction with a provider of the service. The cloud service allows a cloud consumer (i.e., user, customer) to obtain various types of computing resources on demand. The cloud service provides a security service that monitors the configuration of the resources and the behavior of the users accessing the resources in real-time in order to detect a connection between user accounts, groups, or devices that may lead to a lateral movement attack.

In one aspect, a lateral movement graph represents a state of the configuration of the entities that have access to resources of a tenant of the cloud service. The lateral movement graph includes paths from a non-sensitive node to a sensitive node. The lateral movement graph is a directed acyclic graph having nodes representing user accounts, devices, and administrative groups and edges representing the relationships between the entities represented by the nodes. Each node is classified as sensitive or non-sensitive depending on the permissions, roles, and credentials associated with the entity of the node. Each edge in each path is analyzed to determine whether the edge can facilitate a lateral movement attack.

A risk score is computed for each edge in the lateral movement graph. In one aspect, the risk score is a weighted sum of three values: the number of distinct non-sensitive nodes that cannot be reached when the edge is detached from the graph; the number of distinct detached sensitive nodes that cannot be reached when the edge is detached from the graph; and the number of distinct paths containing the edge. The risk score for each edge is used to identify a potential exposure for which preventive actions are recommended or performed to eliminate a potential lateral movement attack.

The risk score may be used to identify a risky edge in a lateral movement path that leads from a non-sensitive entity to a sensitive entity.

Attention now turns to a further discussion of the system, devices, components, and methods utilized in the system.

System

Figure 1:
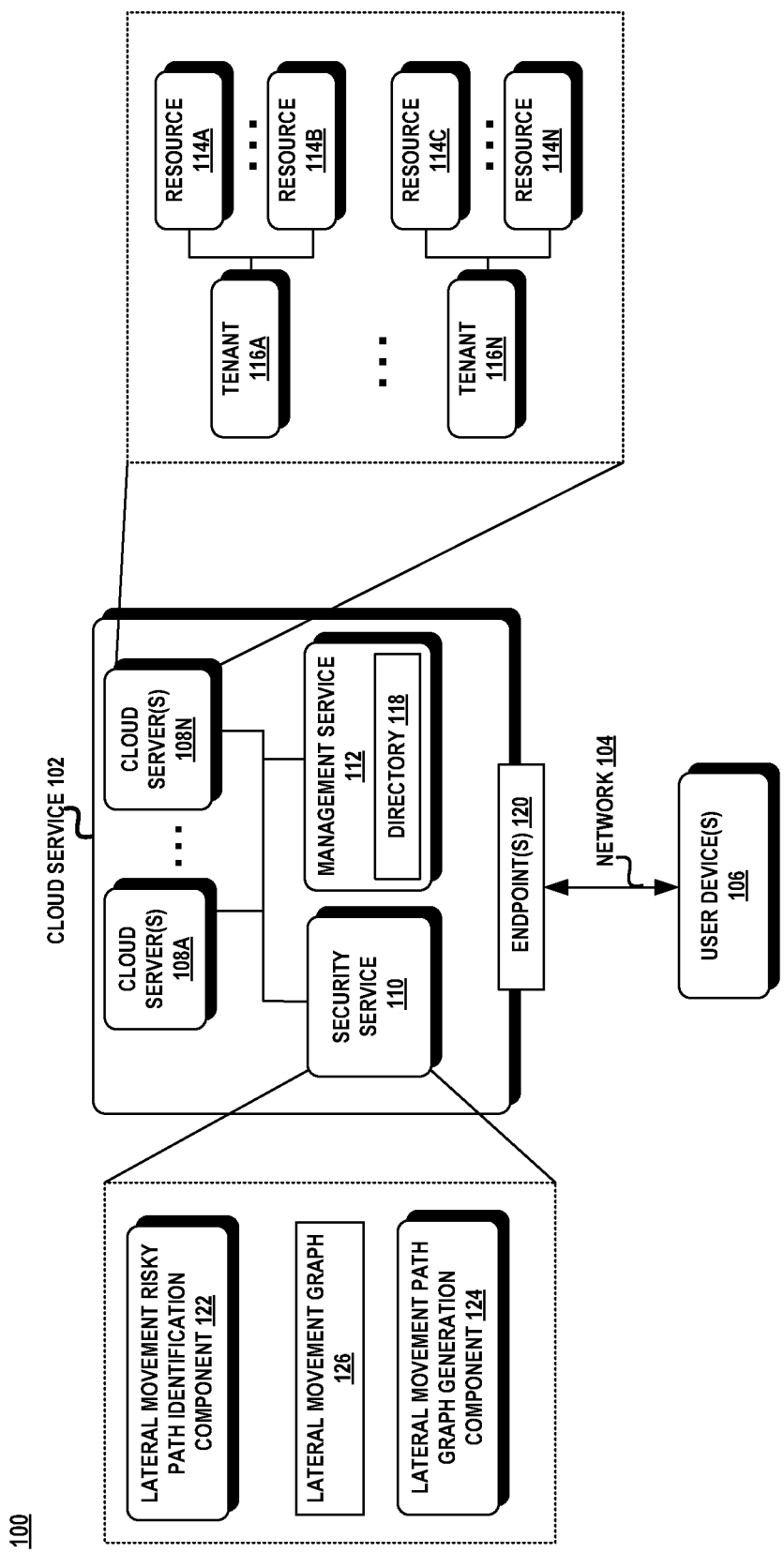
FIG. 1 illustrates an exemplary system for the real-time identification of a risky edge in a lateral movement graph.

FIG. 1 illustrates a block diagram of an exemplary system 100 in which various aspects of the invention may be practiced. In one aspect, the exemplary system 100 includes a cloud service 102 coupled through a network 104 to one or more user devices 106. The cloud service 102 may include one or more servers 108A-108N coupled to a security service 110 and a management service 112.

A cloud service 102 is a computing environment for enabling convenient, on-demand network access to a shared pool of configurable computing resources that can be rapidly generated and released with nominal management effort or interaction with a provider of the service. The cloud service 102 allows a cloud consumer to obtain computing resources, such as networks, network bandwidth, servers, processing memory, storage, applications, virtual machines, and services as a service on an elastic and sometimes temporary basis. The cloud service platforms and infrastructures allow developers to build, deploy, and manage assets and resources for applications.

In one aspect, a cloud service 102 hosts the resources 114A-114N of multiple tenants 116A-116N. A tenant 116A-116N is a directory that is associated with an enterprise, organization, group, user or entity that subscribes to the cloud service 102. A tenant 116A-116N contains resources, such as virtual machines, applications, application programming interfaces (APIs), storage accounts, services, etc. that are grouped into a subscription. A subscription is an object that represents a folder where the resources reside. A tenant 116A-116N may have many subscriptions. A resource 114A-114N is an entity that is managed by the cloud service 102.

The cloud service 102 hosts the tenant's subscriptions and controls access to the resources contained within a subscription. A subscription may be fee-based or free and lasts for a designated length of time. Examples of a cloud service include without limitation, Microsoft Azure®, Google Cloud Platform™ service, iCloud®, and the like.

The cloud servers 108A-108N may be part of a datacenter that provides distributed computing services such as cloud computing services. A data center can provide pooled resources on which customers or tenants can dynamically provision and scale applications as needed without having to add servers or additional networking. The datacenter can be configured to communicate with local computing devices used by cloud consumers including personal computers, mobile devices, embedded systems, or other computing devices. Within the data center, computing devices can be configured as servers, either as standalone devices or individual blades in a rack of one or more other server devices. A tenant may initially use one virtual machine on a server to run an application. The datacenter may activate additional virtual machines on a server or other servers when demand increases, and the datacenter may deactivate virtual machines as demand drops.

A datacenter may be an on-premises, private system that provides services to a single enterprise user or may be a publicly (or semi-publicly) accessible distributed system that provides services to multiple, possibly unrelated customers and tenants, or may be a combination of both. Further, a datacenter maybe contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A tenant 116A-116N may communicate with other devices, including each other or with devices located outside the cloud service 102 via a network 104, such as the internet. In one example, a tenant 116A-116N may communicate with other devices via assigned network addresses, such as an assigned internet protocol (IP) address. In one example, a user of a device 106 can log in to a tenant 116A-116N and access resources 114A-114N. In some examples, the resources 114A-114N are available to authorized users, and the user may have further restrictions via permissions from a set of permission levels to each authorized user for each resource in the cloud service 102.

A management service 112 helps users log onto and access the resources 114A-114N of a tenant 116A-116N including external resources such as software as a service applications and applications on the tenant's network and intranet such as with a single sign on (SSO). In one aspect, the management service 112 provides similar features as a domain directory service such as the configuration of user groups, authentication and authorization. However, the management service 112 differs from domain directory services since the domain directory services are unable to manage web-based services.

A domain directory service is a type of database that organizes resources of a computer network and provides authentication and authorization to applications, file services, printers and other on-premises resources. A domain directory service or name service maps the names of network resources to their respective network addresses. The domain directory service is a shared information infrastructure for locating, managing, administering and organizing everyday items and network resources, which can include volumes, folders, files, printers, users, groups, devices, telephone numbers and other objects. The domain directory service can consider each resource on the network an object. Information about a particular resource is stored as a collection of attributes associated with that resource or object. One example of a domain directory service is available under the trade designation Active Directory Domain Service from the Microsoft Corporation. An exemplary domain directory service can authorize all users and computers in a domain type network, which can include assigning and enforcing security policies for all computers and installing or updating software. For example, when a user logs into a computer that is part of the domain, the domain directory service checks the submitted password and determines whether the user is a system administrator or normal user. Also, the domain directory service allows management and storage of information, provides authentication and authorization mechanisms, and establishes a framework to deploy other related services such as Certificate Services, Federated Services, Lightweight Directory Services and Rights Management Services. In one example, the domain directory service uses protocols such as Kerberos and New Technology Local Area Network Manager (NTLM) for authentication and Lightweight Directory Access Protocol (LDAP) to query and modify items in the domain directory service.

By contrast, the management service 112 is configured to support web-based services that apply REST (REpresentational State Transfer) API (Application Programming Interface) interfaces for many software as a service applications. The management service 112 applies different protocols than the domain directory service. For example, the management service 112 applies protocols that can work with web-based services such as authentication protocols including Security Assertion Markup Language (SAML), Open Authorization (OAuth), an identity layer on top of OAuth protocol such as OpenID Connect, and Web Services Federation (WS-Federation). In one aspect, each tenant may apply an instance of management service, such as a directory 118 for the tenant. The directory 118 may be configured to include the tenant's users, groups, and applications and may perform identify and access management functions for the tenant's resources.

A user device 106 communicates with the cloud service through REST APIs. A REST API is used to request information or access to a resource from the cloud service 102 using an HyperText Transfer Protocol (HTTP) method. The cloud service 102 responds by returning an HTTP response. The REST APIs are transmitted to an endpoint 120 of the cloud service 102. An endpoint 120 is a port that connects a device to a service hosted by the cloud service 102. The endpoint 120 is addressed by a uniform resource locator (URL) that the user device 106 uses to access a resource or service hosted by the cloud service 102. The cloud service 102 may have multiple endpoints 120. In one aspect, the endpoints 120 are API endpoints, each of which are configured to receive requests through a designated REST API.

The security service 110 protects and secures the resources from malicious communication or other threats. In one example, the security service 110 can include controls to manage and configure the security of the resources 114A-114N in order to customize the security for the tenants 116A-116N. The security service 110 can include isolation features to prevent unauthorized or unintentional transfer of data between deployments of a multi-tenant architecture. Additionally, the security service 110 can include network and endpoint protection in the form of firewalls and virtual firewalls. For example, security service 110 can include a network group virtual firewall feature to control network traffic to instances of virtual machines. Additionally, security service 110 can provide for logging and monitoring events including security-related events with agents on each compute, storage, or fabric node in the environment.

The security service 110 may include a lateral movement risky path identification (LMRPI) component 122 and a lateral movement path (LMP) graph generation component 124. The LMRPI component 122 identifies those paths having an edge that represents the most risk for a lateral movement vulnerability. The risky edge identifies a relationship between a user account, device, and/or logon session that presents a vulnerability for a lateral movement attack.

The LMP graph generation component 124 generates a lateral movement graph 126, for each tenant, representing the relationships between the users, devices, groups associated with a tenant. In one aspect, the LMP graph generation component 124 retrieves data from the management service 112 regarding the relationships between the users, devices, and logon sessions of a tenant in order to construct the LMP graph for the tenant 116. In order to identify lateral movement paths, data regarding the users, devices, groups, and logon sessions is retrieved using an application programming interface (API) that provides access to web services via an endpoint 120. In one example, the LMP graph generation component 124 may use REST APIs and secure permissions with OAuth protocols. An example unified API endpoint and management service directory identity protection API is available under a Microsoft Graph API, which can provide programmatic access to the directory 118 of the management service 112. The LMP graph generation component 124 may also extract data regarding the devices that joined the management service 112, memberships of roles and groups, administrators such as local administrators, device administrators, and users or accounts that perform the directory join, and log-on sessions with devices. Alternatively, the LMP graph generation component 124 may be generated from a tool that monitors the users' behavior and activities and obtains information about each tenant, such as permissions and group memberships. Examples of such software tools include Microsoft® Azure® ATP and the Microsoft® Advanced Threat Analytics.

A domain is a set of users and machines sharing a common management infrastructure that can be accessed and administered with a common set of rules. At least one machine of the set acts as a domain controller and hosts a member list that identifies all the members of the domain. An administrator can be assigned tasks for specific purposes, such as adding or changing the users in a domain, assigning roles, and managing the domain name. An administrator may have complete and unrestricted access to a machine or domain.

Figure 2:
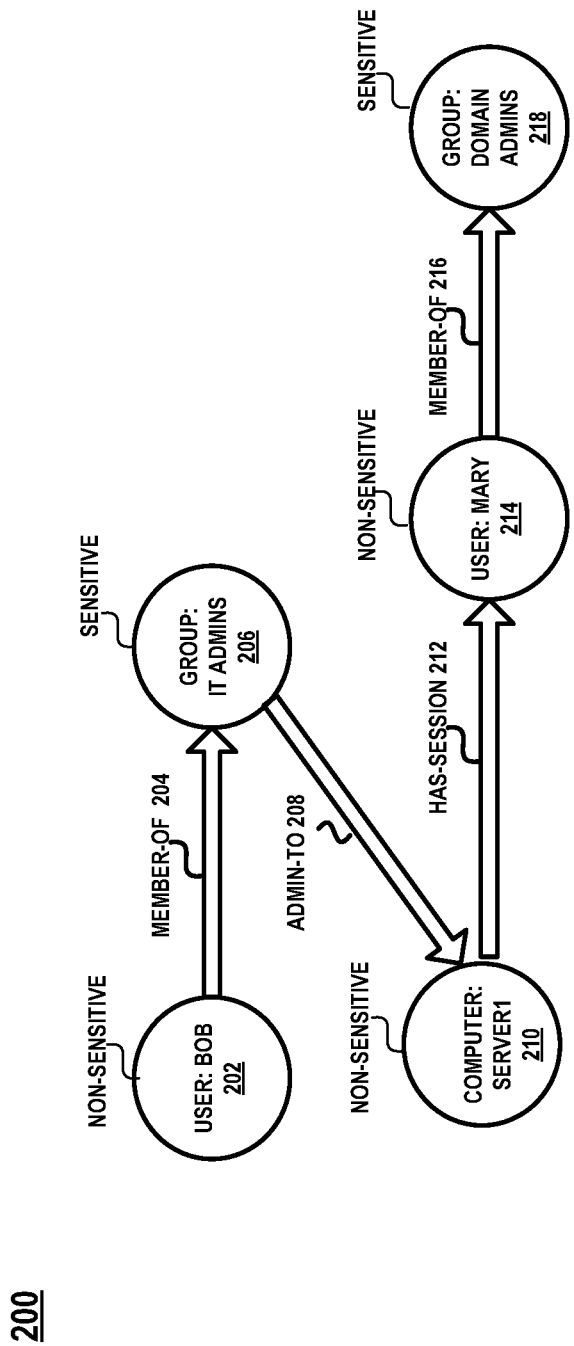
FIG. 2 is a schematic diagram illustrating an exemplary lateral movement graph.

Turning to FIG. 2, there is shown an exemplary LMP graph 200. The LMP graph 200 is a directed acyclic graph containing one or more nodes connected by edges where the edges have a direction from a source node to a sink node and the graph does not have any cycles. A node represents entities, such as a user or user account, a group, or device that is associated with a tenant and an edge represents a relationship between the two connected entities. A group may be a group of user accounts, a group of administrators, and a group of devices.

An edge may represent the relationships of "Administrator-To", "Member-Of", or "Has-Session." The "Administrator-To" edge represents that an administrator controls privileges to a device, the "Member-Of" edge represents that a user is a member of a particular group, and that "Has-Session" represents that a particular device is currently engaged in a user or logged-on session with a particular device. A path is a sequence of edges that joins a sequence of connected nodes. However, it should be noted that the edges may represent other relationships than those shown in FIG. 2 such as the privileges, credentials, or permissions that each entity has to another entity.

As shown in FIG. 2, user account, Bob, 202, is a "Member-Of", 204, the group, IT Admins 206. The group, IT admins 206, is the "Administrator-To" 208 a computer identified as Server1 210. The computer, Server1, 210, currently "Has-Session" 212 with user account, Mary, 214, and the user account, Mary, 214, is a "Member-Of" 216 the group, Domain Admins, 218.

The LMP graph 200 also associates a label to each node that indicates whether a node is sensitive or non-sensitive. A sensitive node represents a device, user account or group that has permissions, privileges, and/or credentials to highly-sensitive data. A sensitive designation may be applied to administrators, power users, account operators, domain administrators, domain controllers, group policy creator owners, and so forth. The sensitive designation may also be user-defined to meet a target objective. The sensitive designation is used to enhance detection of a risky lateral movement path. A non-sensitive designation applies to those users, devices and groups not deemed sensitive. Turning to FIG. 2, nodes 206 and 218 are identified as sensitive since they represent administrator groups and nodes 202, 210, and 212 are non-sensitive.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
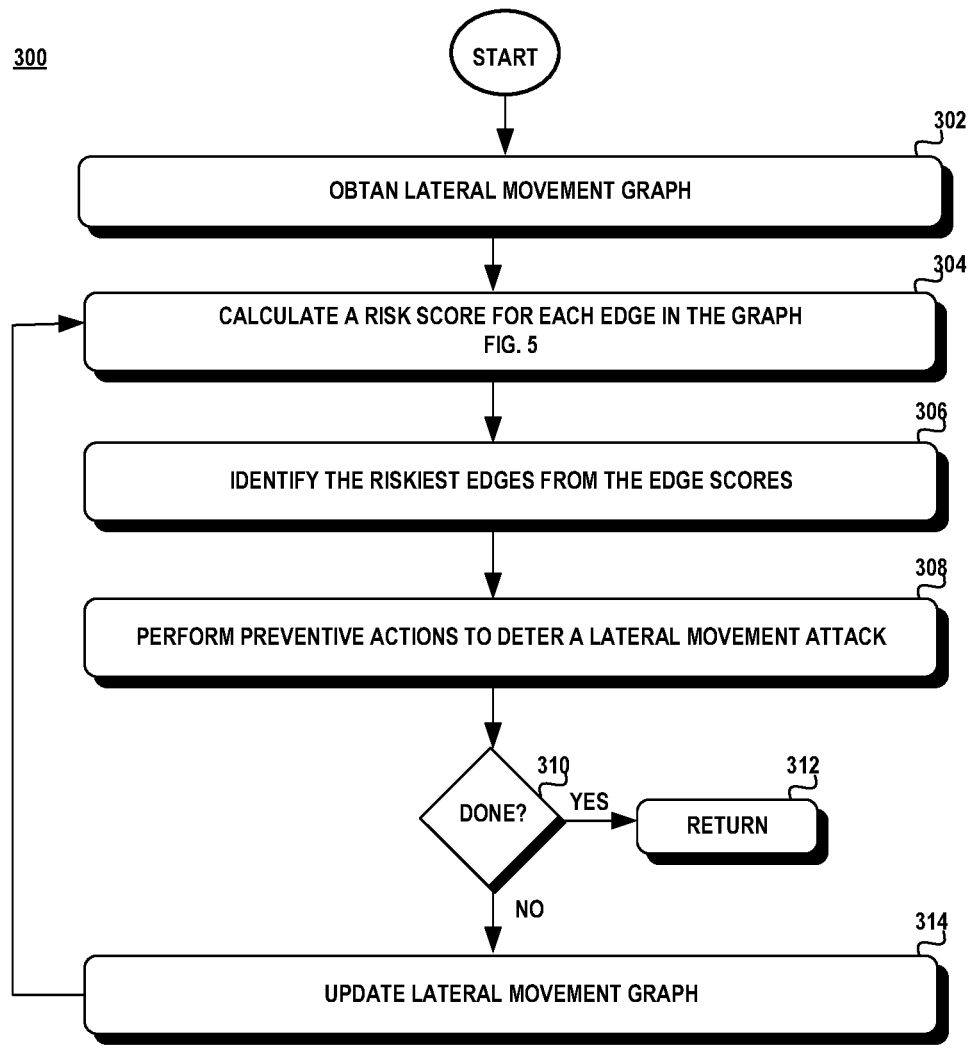
FIG. 3 is an exemplary flow diagram illustrating a method for the real-time detection of a risky edge in a lateral movement graph.

FIG. 3 illustrates an exemplary method 300 for identifying risky edges in a lateral movement graph. Referring to FIGS. 1 and 3, a lateral movement graph 126 maybe generated for each tenant 116A-116N in the cloud service 102 (block 302). The LMP graph generation component 124 generates the lateral movement graphs 126 from data retrieved from the management service 112 or obtains the graph from existing software tools, as noted above. Additionally, the LMP graph generation component 124 updates the LMP graphs 126 periodically to obtain the most current tenant data. The updates may be made at pre-configured time intervals or dynamically based on the frequency and/or occurrence of certain events.

For each tenant's LMP graph 126, the LMRPI component 122 calculates a risk score for each edge of the graph (block 304). The risk score identifies the riskiest edges that have the most potential for a lateral movement attack and may be used to prioritize which edges require additional scrutiny (block 306).

Upon detection of a risky edge, the LMRPI component 122 may perform one or more preventive actions to deter a lateral movement attack (block 308). In one aspect, the preventive actions may be recommendations of actions that an administrator may perform. Alternatively, the cloud service 102 may initiate the preventive actions on its own. The preventive actions may include removing a user account or device from a group, removing a group from a domain, preventing a user from logging onto a device, removing a local administrator from a domain controller, and so forth.

The LMP graph generation component 124 updates the LMP graph 126 for each tenant periodically (block 314) and the process is repeated (block 310—no) to detect other risky edges on a lateral movement path (blocks 304-308), until the process is terminated (block 310—yes, block 312).

Turning to FIG. 4, there is shown an exemplary security report 400 identifying the actions taken by the LMRPI component to deter a lateral movement attack. The report 400 identifies the entity name 402 associated with a risky edge, an action to be performed to deter the lateral movement attack 404, the target device, account, or group 406 associated with the risky entity, and the security impact 408. The security impact 408 is a value derived from the risk score associated with the risky edge. As shown in FIG. 4, the User1 account has the riskiest security impact with a score of 442 and the recommended action is to remove the User1 account from the Finance Users Group (line 410). The User20 account has a security impact of 20 and the recommended action is to prevent the User20 account from logging into the RDPSV device (line 412). The TempAdmin account has a security impact of 10 and the recommended action is to remove TempAdmin account from the Helpdesk-Server device (414). The Exch01 account has a security impact of 5 and the recommended action is to remove the Exch01 account from the DomainAdmins Group (416). The User3 account has a security impact of 5 and the recommended action is to prevent the User3 account from logging into the DC5 device (418).

Figure 5:
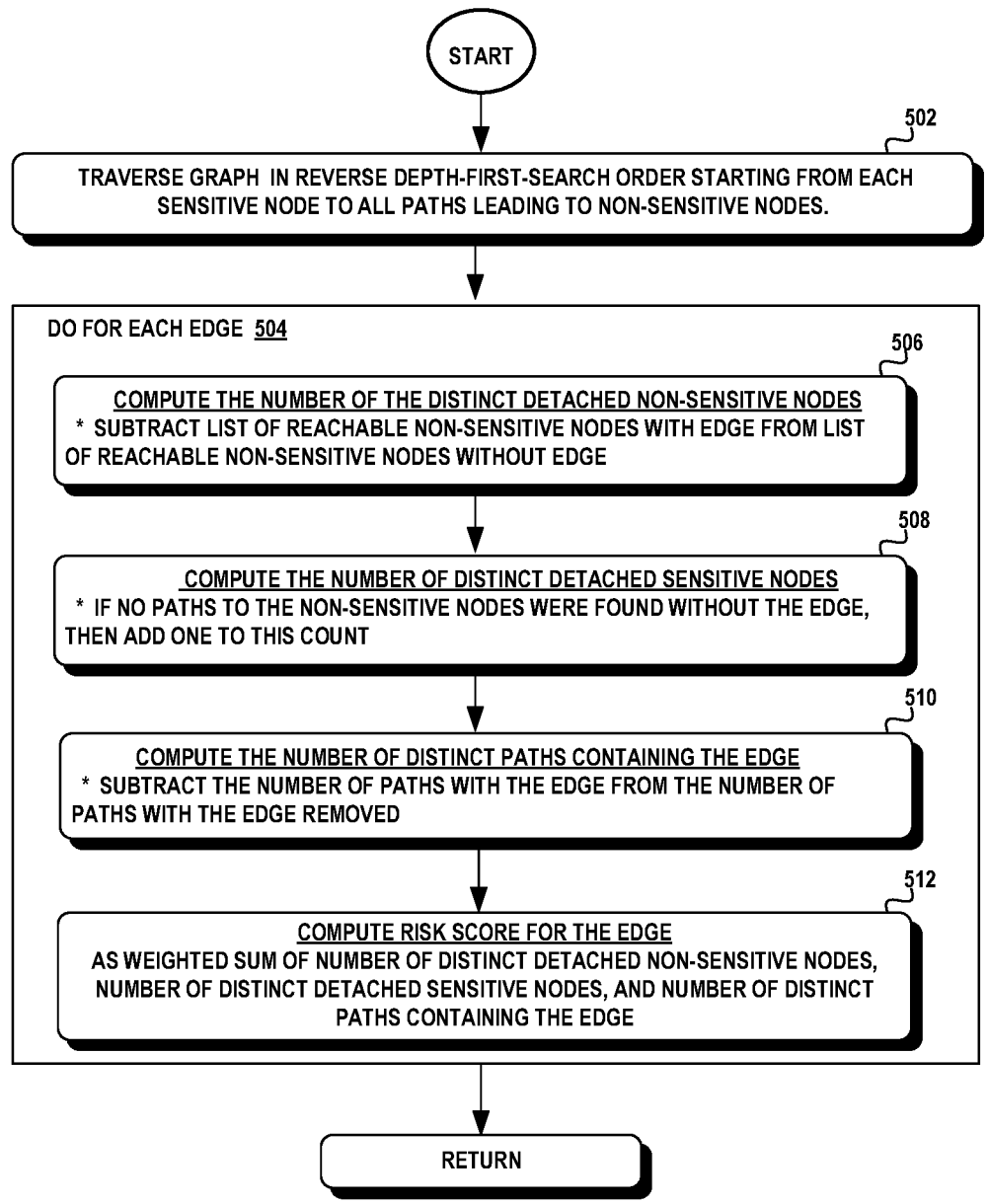
FIG. 5 is an exemplary flow diagram illustrating a method for assigning a risk score to each edge of the lateral movement graph.

Turning to FIG. 5, there is shown an exemplary method 500 illustrating the manner in which the risk score for an edge is computed. In one aspect, the risk score, for an edge, is computed as a weighted sum of three values: the number of distinct detached non-sensitive nodes; the number of distinct detached sensitive nodes; and the number of distinct paths containing the edge. A path is a sequence of edges which joins a sequence of distinct nodes. A distinct detached non-sensitive node is a non-sensitive node that cannot be reached since there is no longer a distinct path to it when a specific edge is detached from the graph. A distinct detached sensitive node is a sensitive node that cannot be reached since there is no longer a distinct path to it when a specific edge is detached from the graph. The risk score for an edge indicates that the edge is on a lateral movement path to a sensitive node.

Referring to FIGS. 1 and 5, the LMRPI component 122 receives a lateral movement graph 126 having nodes of users, devices, and groups and edges of "Administrator-Of", "Has-Session", and/or "Member-Of." Certain nodes are designated as sensitive and others are designated as non-sensitive.

The LMRPI component 122 computes a risk score for each edge by performing a reverse traversal of the graph 126 starting from each sensitive node (block 502). In one aspect, the traversal may use a reverse depth-first search order that starts from a sensitive node and traverses each path leading from the sensitive node to each connected non-sensitive node (block 502).

For each edge in a path to a sensitive node 126 (block 504), the number of distinct detached non-sensitive nodes is computed (block 506). This may be computed by subtracting the list of reachable nodes with the edge intact from the list of reachable nodes with the edge removed (block 506).

Next, the number of distinct detached sensitive nodes is computed (block 508). This number is set to one when there are no paths to the non-sensitive nodes when the edge is removed (block 508). The number of distinct paths containing the edge is computed as the difference between the number of paths in the graph with the edge intact from the number of paths in the graph with the edge removed (block 510).

The risk score is then derived as the sum of the number of distinct detached non-sensitive nodes, the number of distinct detached sensitive nodes and the number of distinct paths containing the edge (block 512). In one aspect, the risk score can be a weighted sum with weights applied to each of the values (block 512). There may be a different weight for each value in the risk score computation.

Figure 6A:
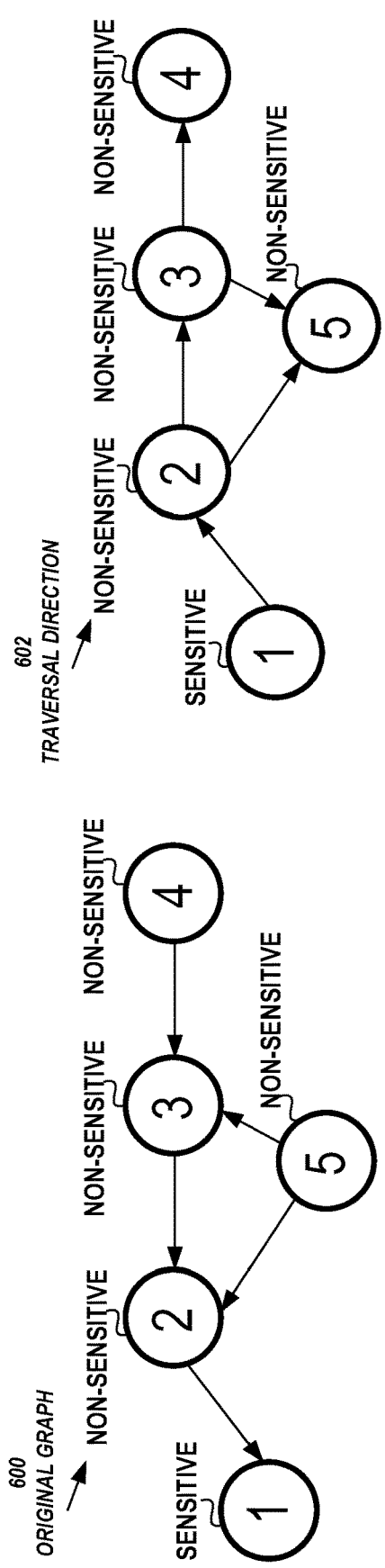
FIGS. 6A-6H are schematic diagrams illustrating an example of an identification of a risky edge.

Attention now turns to an illustration of the computation of the risk score for each edge of a lateral movement graph. Turning to FIG. 6A, there is shown an exemplary lateral movement graph 600 which contains several paths to a sensitive node (node 1). The graph 600 has directed edges from several non-sensitive nodes (nodes 2-5) to the sensitive node (node 1). The arrows of the edges in graph 600 illustrate the direction of the relationship.

Figure 6B:
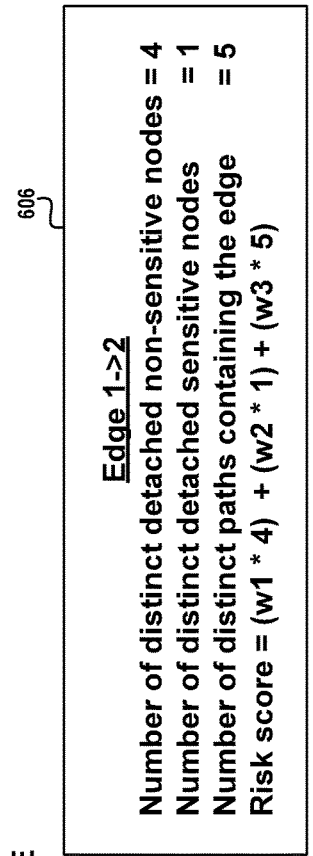

As shown in FIG. 6B, the graph 602 is traversed from the sensitive node (node 1) in a reverse depth first search manner to compute the three values needed to compute the risk score. The arrow of the edges point to the traversal direction which starts at the sensitive node (node 1) and traverses down each path to all the non-sensitive nodes (nodes 2-5).

Figure 6C:
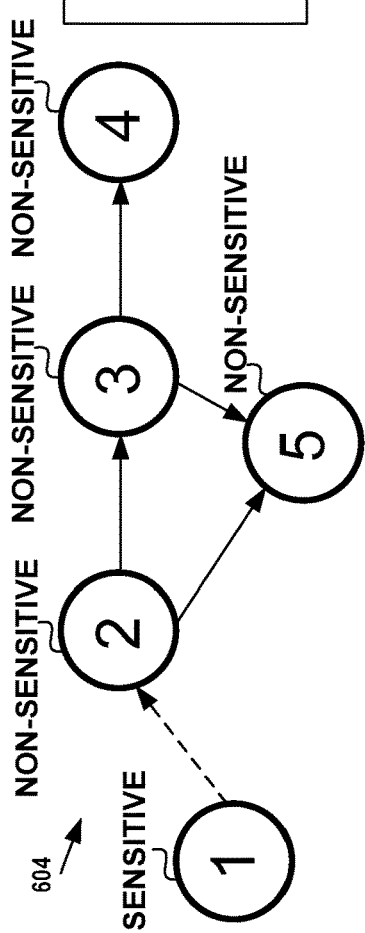

FIG. 6C depicts graph 604 which illustrates the computation of the risk score for the directed edge from node 1 to node 2, shown as Edge 1→2. When the edge is removed, as shown in the dotted line from node 1 to node 2, the number of distinct detached non-sensitive nodes is 4 which includes nodes 2, 3, 4 and 5. The number of distinct detached sensitive nodes is 1 since node 1 cannot be reached when the edge 1→2 is removed. The number of distinct paths containing the edge is 5 which includes the path from node 1 to node 2, the path from node 1 to node 2 to node 3, the path from node 1 to node 2 to node 3 to node 4, the path from node 1 to node 2 to node 5, and the path from node 1 to node 2 to node 3 to node 5. The risk score for this edge is computed as (W1*4)+(W2*1)+(W3*5), where W1 is a weight applied to the number of distinct detached non-sensitive nodes, W2 is a weight applied to the number of distinct detached sensitive nodes, and W3 is a weight applied to the number of distinct paths containing the edge (box 606).

Figure 6D:
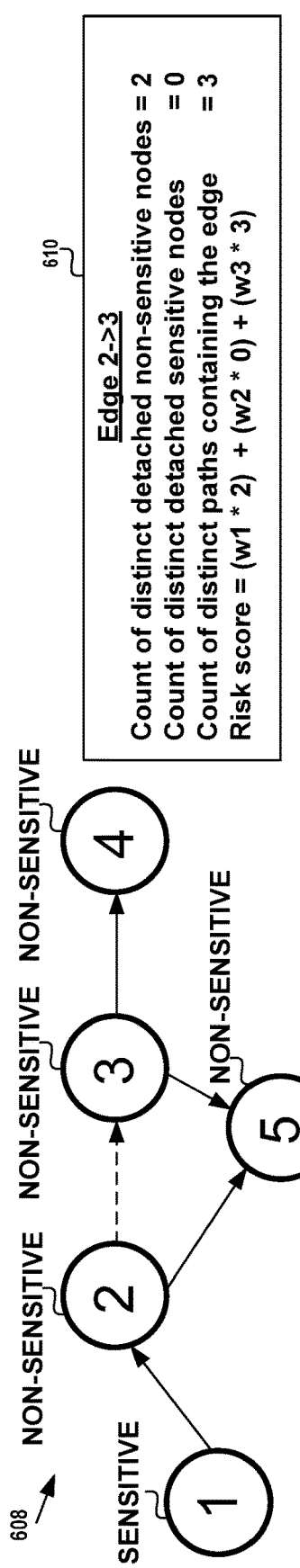

FIG. 6D depicts graph 608 which illustrates the computation of the risk score for the edge from node 2 to node 3, shown as Edge 2→3. When the edge is removed, as shown in the dotted line between nodes 2 and 3, the number of distinct detached non-sensitive nodes is 2 which includes nodes 3 and 4. The number of distinct detached sensitive nodes is 0 since node 1 can be reached when the edge 2→3 is removed. The number of distinct paths containing the edge is 3 which includes the path from node 2 to node 3, the path from node 2 to node 3 to node 4, and the path from node 2 to node 3 to node 5. The risk score for this edge is computed as (W1*2)+(W2*0)+(W3*3), where W1, W2, and W3 are respective weights (box 610).

Figure 6E:
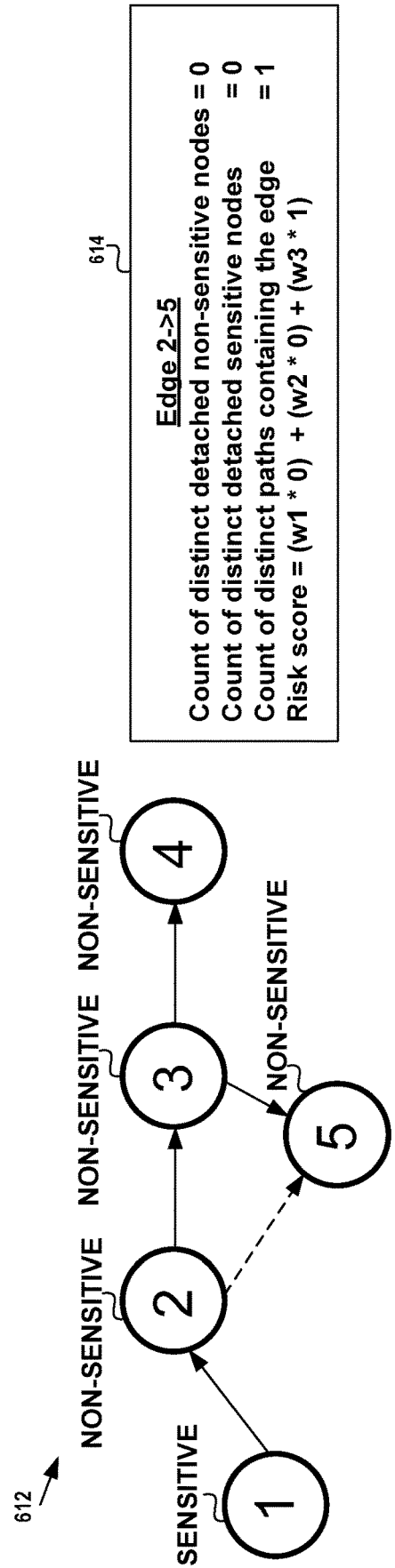

FIG. 6E depicts graph 612 which illustrates the computation of the risk score for the edge from node 2 to node 5, shown as Edge 2→5. When the edge is removed, as shown in the dotted line between nodes 2 and node 5, the number of distinct detached non-sensitive nodes is 0 since there is a path to all of the non-sensitive nodes in the graph. The number of distinct detached sensitive nodes is 0 since node 1 can be reached when the edge 2→5 is removed. The number of distinct paths containing the edge is 1 which is the path from node 2 to node 5. The risk score for this edge is computed as (W1*0)+(W2*0)+(W3*1), where W1, W2, and W3 are respective weights (box 614).

Figure 6F:
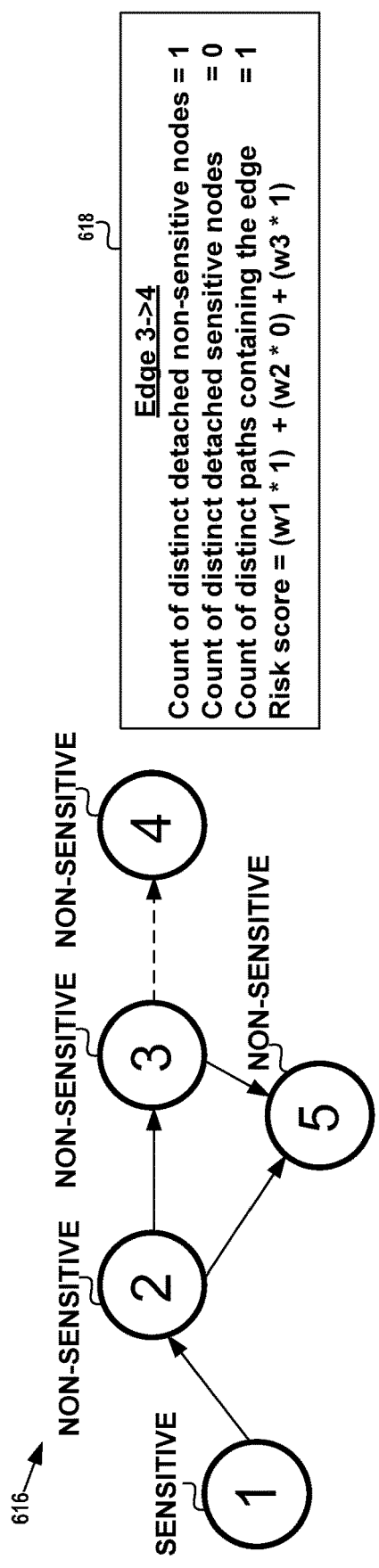

FIG. 6F depicts graph 616 which illustrates the computation of the risk score for the edge from node 3 to node 4, shown as Edge 3→4. When the edge is removed, as shown in the dotted line from node 3 to node 4, the number of distinct detached non-sensitive nodes is 1 since there is no longer a path to node 4. The number of distinct detached sensitive nodes is 0 since node 1 can be reached when the edge 3→4 is removed. The number of distinct paths containing the edge is 1 which is the path from node 3 to node 4. The risk score for this edge is computed as (W1*1)+(W2*0)+(W3*1), where W1, W2, and W3 are respective weights (box 618).

Figure 6G:
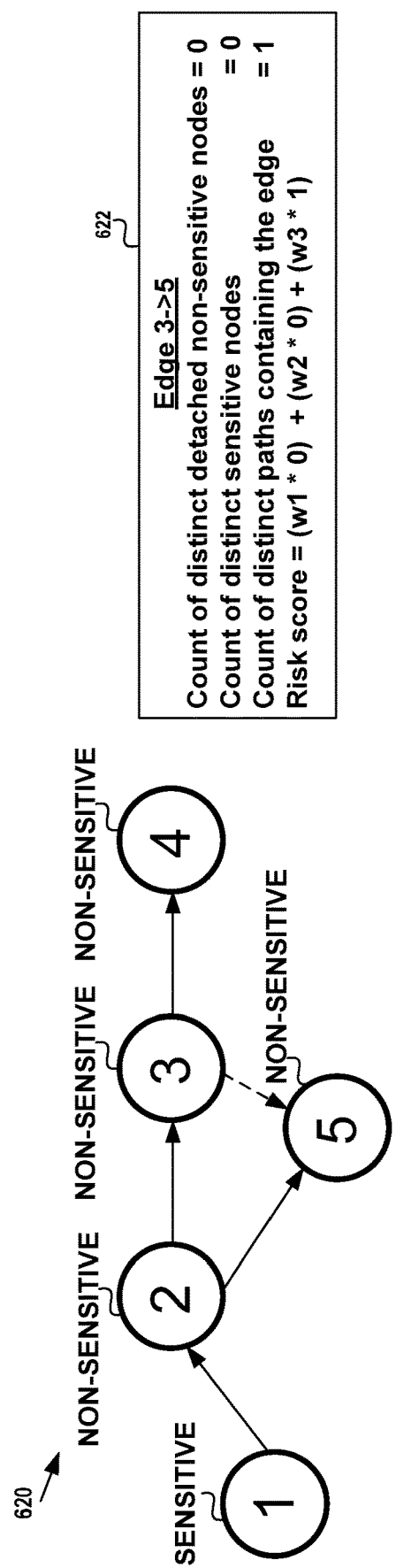

FIG. 6G depicts graph 620 which illustrates the computation of the risk score for the edge from node 3 to node 5, shown as Edge 3→5. When the edge is removed, as shown in the dotted line from node 3 to node 5, the number of distinct detached non-sensitive nodes is 0 since there are paths to each of the non-sensitive nodes. The number of distinct detached sensitive nodes is 0 since node 1 can be reached when the edge 3→5 is removed. The number of distinct paths containing the edge is 1 which is the path from node 3 to node 5. The risk score for this edge is computed as (W1*0)+(W2*0)+(W3*1), where W1, W2, and W3 are respective weights (box 622).

Figure 6H:
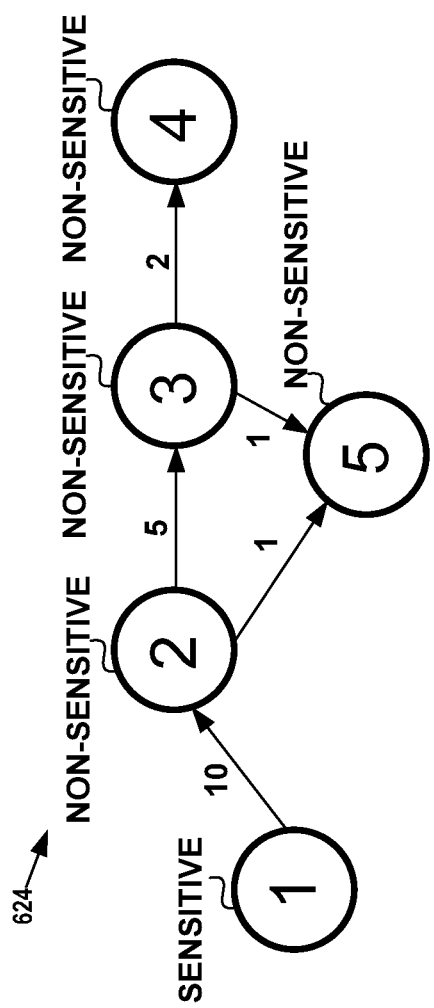

FIG. 6H represents exemplary results of the computation of the risk score. The graph 624 shows the risk score for each edge assuming that no weights are applied. The risk score for the edge 1→2 is ten, the risk score for edge 2→3 is five, the risk score for edge 2→5 is one, the risk score for the edge 3→5 is one and the risk score for the edge 3→4 is two. These results indicate that the riskiest edge is edge 1→2 which has the potential for a lateral movement attack.

Exemplary Operating Environment

Figure 7:
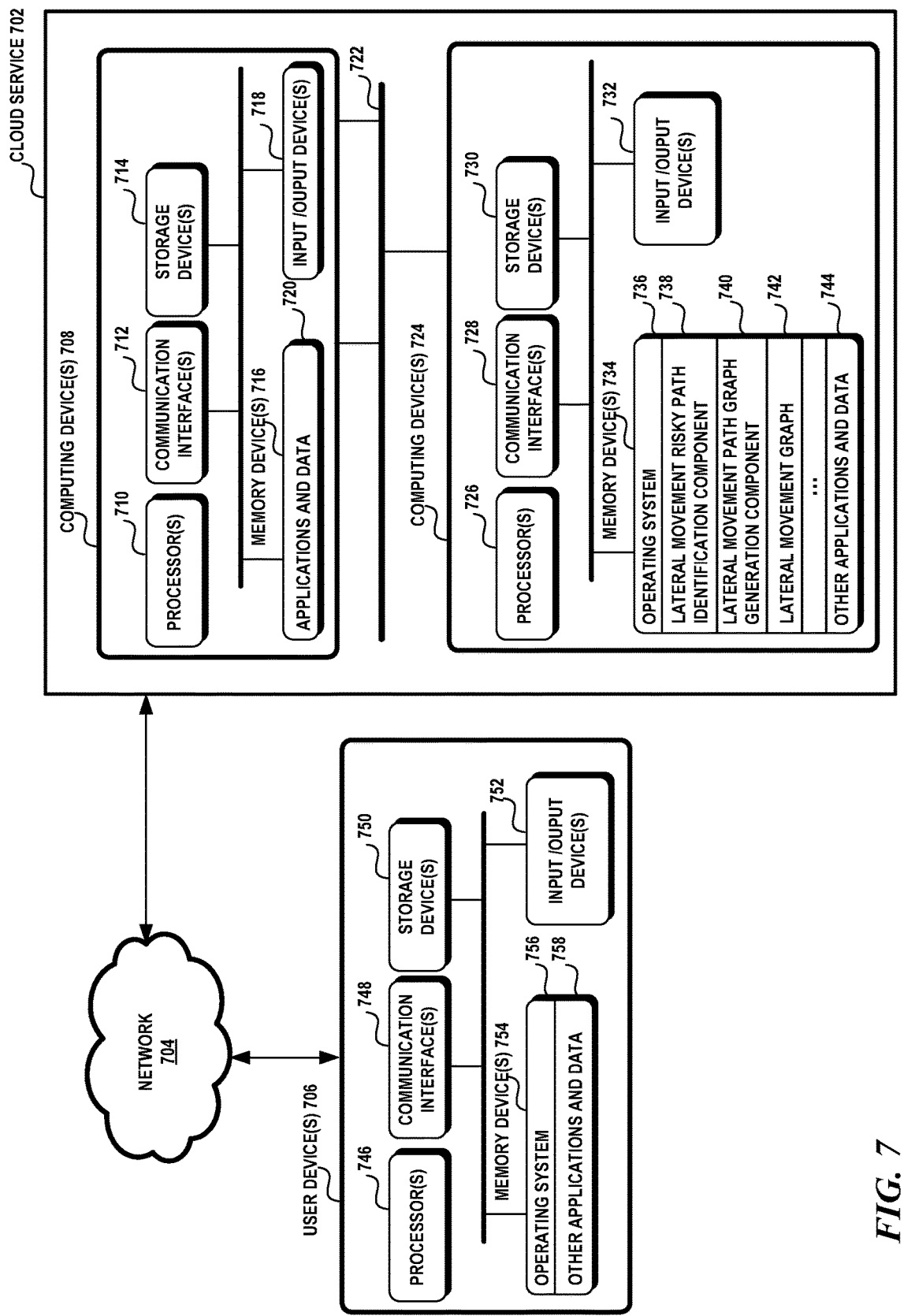
FIG. 7 is a block diagram illustrating an exemplary operating environment.

Attention now turns to a discussion of an exemplary operating environment. FIG. 7 illustrates an exemplary operating environment 700 in which one or more computing devices of a cloud service are used to perform the real-time identification of a risky edge in a lateral movement path. The cloud service 702 is connected through a network 704 to one or more user devices 706. However, it should be noted that the aspects disclosed herein is not constrained to any particular configuration of devices and that other configurations are possible.

A cloud service 702 may be composed of one or more computing devices 708, 724 coupled to a network 722. A computing device 708, 724 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, Internet of Things (IOT) device, a web appliance, a distributed computing system, multiprocessor systems, or combination thereof.

A computing device 708, 724 may include one or more processors 710, 726, one or more communication interfaces 712, 728, one or more storage devices 714, 730, one or more input/output devices 718, 732, and one or more memory devices 716, 734. A processor 710, 726 may be any commercially available or customized processor and may include dual microprocessors and multi-processor architectures. A communication interface 712, 728 facilitates wired or wireless communications between the computing device 708, 724 and other devices. A storage device 714, 730 may be computer-readable medium that does not contain propagating signals, such as modulated data signals transmitted through a carrier wave. Examples of a storage device 714, 730 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 714, 730 in a computing device 708, 724. The input/output devices 718, 732, may include a keyboard, mouse, pen, voice input device, touch input device, display, speakers, printers, etc., and any combination thereof.

A memory device 716, 734 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 716 may also include one or more external storage devices or remotely located storage devices that do not pertain to propagated signals, such as modulated data signals transmitted through a carrier wave. Memory device 716 may be used to store various applications and data 720. Memory device 734 may include an operating system 736, a lateral movement risky path identification component 738, a lateral movement graph generation component 740, a lateral movement graph 742 and other applications and data 744.

The computing devices 708, 724 may be communicatively coupled to each other through network 704 and to other devices through network 722. The networks 704, 722 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The networks 704, 722 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

One or more user devices 706 communicate with the computing devices 708, 724 of the cloud service 702 through network 704. In one aspect, network 704 is the Internet. The user devices 706 may include one or more processors 746, a communication interface 748, one or more storage devices 750, input/output device 752, one or more memory devices 754 as described above. The one or more memory devices 754 include an operating system 756 and other applications and data 758.

CONCLUSION

A system is disclosed having one or more processors coupled to a memory. One or more programs are stored in the memory and configured to be executed by the one or more processors. The one or more programs including instructions that: obtain a graph having paths, a path includes nodes and edges, the nodes of users, groups, and devices, the edges of relationships between each node connected to an edge, the graph representative of a tenant of a cloud service, wherein a node is classified as sensitive or non-sensitive; identify a risky edge in paths that lead to a sensitive node; and perform an action to eliminate the relationship between nodes connected to the risky edge.

In one aspect, an edge represents one of Administrator-Of, Has-Session, and Member-Of. The one or more programs include further instructions that: update the graph periodically during operation of the cloud service. The one or more programs include further instructions that: determine if another risky edge exists from the updated graph. Additional instructions identify the risky edge from a risk score, the risk score based on a number of distinct detached non-sensitive nodes, a number of distinct detached sensitive nodes, and a number of distinct paths containing the risky edge.

In other aspects, the risk score is a weighted sum of the number of distinct detached non-sensitive nodes, the number of distinct detached sensitive nodes, and the number of distinct paths containing the risky edge. The one or more programs include further instructions that: identify the risky edge from a risk score, the risk score applies a first weight to a number of distinct detached non-sensitive nodes, applies a second weight to a number of distinct detached sensitive nodes, and applies a third weight to a number of distinct paths containing the risky edge.

A method is disclosed comprising representing entities having access to resources in a tenant of a cloud service in a graph, the graph having nodes of entities and edges representing a relationship between two connected entities, at least one node representing a sensitive entity, at least one node representing a non-sensitive entity; determining whether an edge in the graph is on a lateral movement path by traversing each path in the graph from a sensitive entity to each connected non-sensitive entity and computing a score for the edge that indicates whether the edge is on a lateral movement path; and based on the score, eliminating a relationship between entities connected to the edge determined to be on the lateral movement path.

In some aspects, the score may be based on a number of distinct detached non-sensitive entities. The score may be based on a number of distinct detached sensitive entities. The score may be based a number of distinct paths containing the edge. The score may be a sum of a number of distinct detached non-sensitive entities, a number of distinct detached sensitive entities and a number of distinct paths containing the edge. The score may be a sum of a first weight applied to a number of distinct detached non-sensitive entities, a second weight applied to a number of distinct detached sensitive entities, and a third weight applied to a number of distinct paths containing the edge.

An edge may represent a relationship of Administrator-Of, Has-Session, or Member-Of. An entity represents a user account, a group, or a device.

A device is disclosed having a processor coupled to a memory. The processor is configured to: obtain a graph of paths, a path includes nodes connected by edges, a node associated with a sensitive entity or a non-sensitive entity, an edge representing a relationship between two connected nodes, wherein the graph represents a configuration of entities having access to resources of a tenant of a cloud service; compute a risk score for each edge in a path, the risk score based on a number of distinct detached non-sensitive nodes, a number of distinct detached sensitive nodes, and a count of distinct paths containing the edge; and identify a risky edge in a path based on a risk score.

An edge may represent an Administrator-Of, Has-Session, or Member-Of relationship between two connected nodes. A node may represent a user account, a device or group.

The risk score is a sum of a number of distinct detached non-sensitive entities, a number of distinct detached sensitive entities and a number of distinct paths containing an edge. In one aspect, the risk score is a sum of a first weight applied to a number of distinct detached non-sensitive entities, a second weight applied to a number of distinct detached sensitive entities, and a third weight applied to a number of distinct paths containing the edge.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and a memory;
one or more programs, wherein the one or more programs are stored in the memory and configured to be executed by the one or more processors, the one or more programs including instructions to perform actions that:
obtain a graph having a plurality of paths, a path includes nodes and edges, wherein a node represents a user, group or device, wherein an edge represents a relationship between each node connected to an edge, the graph representative of a tenant of a cloud service, wherein a node is classified as sensitive or non-sensitive;
identify a risky edge that leads to a lateral movement path in the paths that lead to a sensitive node, wherein the identification of the risky edge is based on a risk score, wherein the risk score is a weighted sum that applies a first weight to a number of distinct detached non-sensitive nodes that cannot be reached when the risky edge is detached from the graph, applies a second weight to a number of distinct detached sensitive nodes that cannot be reached when the risk edge is detached from the graph, and applies a third weight to a number of distinct paths containing the risky edge; and
perform an action to eliminate the relationship between the nodes connected to the risky edge in order to prevent a lateral movement attack.

2. The system of claim 1, wherein an edge represents one of the relationships of Administrator-Of, Has-Session, and Member-Of.

3. The system of claim 1, wherein the one or more programs include further instructions to perform actions that: update the graph periodically during operation of the cloud service.

4. The system of claim 3, wherein the one or more programs include further instructions to perform actions that: determine if another risky edge exists from the updated graph.

5. The system of claim 1, wherein the sensitive node represents a device, user or group that has permissions, privileges, and/or credentials to highly-sensitive data.

6. The system of claim 5, wherein a sensitive classification is applied to administrators, power users, account operators, domain administrators, domain controllers, and group policy creator owners.

7. A method, comprising:
representing entities having access to resources in a tenant of a cloud service in a graph, the graph having a plurality of paths, each path including nodes of entities and edges representing a relationship between two connected entities, at least one node representing a sensitive entity, at least one node representing a non-sensitive entity;
determining whether a first edge in the graph is on a lateral movement path by traversing each path of the plurality of paths in the graph from a sensitive entity to each connected non-sensitive entity and computing a risk score for the first edge, the risk score is a weighted sum that applies a first weight to a number of distinct detached non-sensitive nodes that cannot be reached when the first edge is detached from the graph, applies a second weight to a number of distinct detached sensitive nodes that cannot be reached when the first edge is detached from the graph, and applies a third weight to a number of distinct paths containing the first edge;
based on the risk score for the first edge indicating a risky edge of a lateral movement path, eliminating a relationship between entities connected to the first edge determined to be on the lateral movement path.

8. The method of claim 7, wherein the sensitive node represents a device, user or group that has permissions, privileges, and/or credentials to highly sensitive data.

9. The method of claim 8, wherein a sensitive classification is applied to administrators, power users, account operators, domain administrators, domain controllers, and group policy creator owners.

10. The method of claim 7, wherein an edge represents a relationship of Administrator-Of, Has-Session, or Member-Of.

11. The method of claim 7, wherein an entity represents a user account, a group, or a device.

12. A device, comprising:
a processor coupled to a memory;
wherein the processor is configured to perform actions to:
obtain a graph having a plurality of paths, a path includes nodes connected by edges, a node associated with a sensitive entity or a non-sensitive entity, an edge representing a relationship between two connected nodes, wherein the graph represents a configuration of entities having access to resources of a tenant of a cloud service;
compute a risk score for a first edge in the plurality of paths, the risk score is a weighted sum that applies a first weight to a number of distinct detached non-sensitive nodes that cannot be reached when the first edge is detached from the graph, applies a second weight to a number of distinct detached sensitive nodes that cannot be reached when the first edge is detached from the graph, and applies a third weight to a number of distinct paths containing the first edge;
identify the first edge as a risky edge in a lateral movement path based on the risk score; and
eliminate the relationship between the two connected nodes of the first edge to prevent a lateral movement attack.

13. The device of claim 12, wherein an edge represents an Administrator-Of, Has-Session, or Member-Of relationship between two connected nodes.

14. The device of claim 12, wherein a node represents a user account, a device or group.

15. The device of claim 12, wherein the sensitive node represents a device, user or group that has permissions, privileges, and/or credentials to highly-sensitive data.

* * * * *